(No Model.)
J. F. KLINGLESMITH.
FARM GATE.
No. 578,604. Patented Mar. 9, 1897.
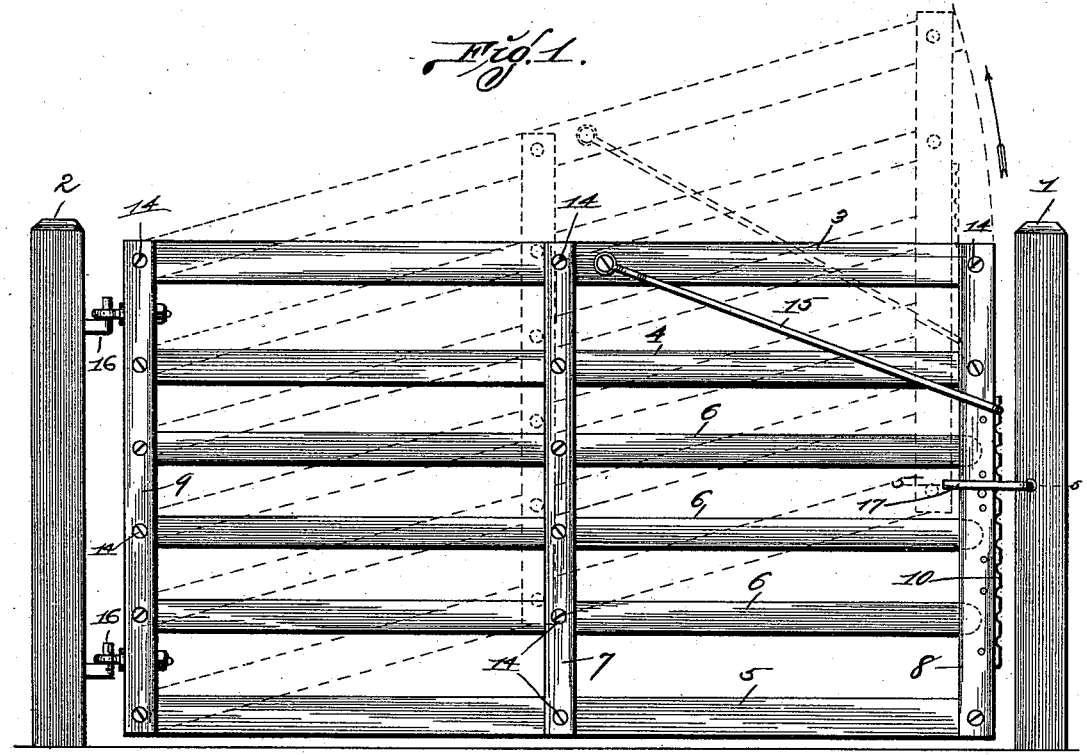
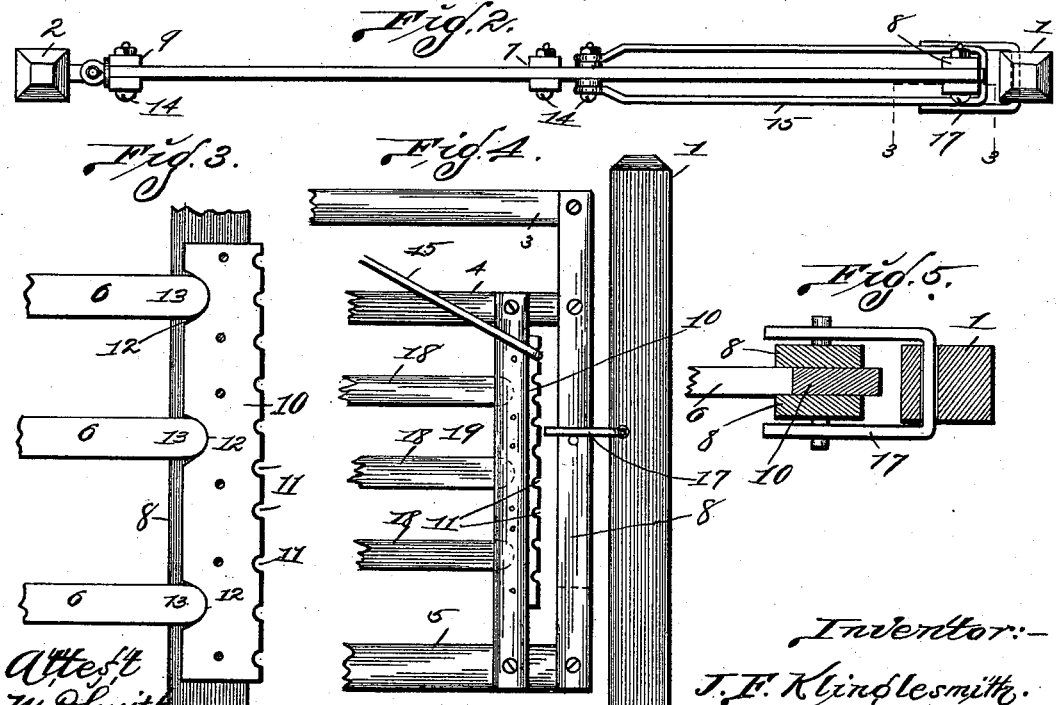
Attest:
M. P. Smith
S. G. Wells
Inventor:—
J. F. Klinglesmith.
By Higdon, Higdon, & Longan,
Att'ys.
THE NORRIS PETERS CO., PHOTO-LITHO., WASHINGTON, D.C.

UNITED STATES PATENT OFFICE.

JOHN F. KLINGLESMITH, OF ST. LOUIS, MISSOURI.

FARM-GATE.

SPECIFICATION forming part of Letters Patent No. 578,604, dated March 9, 1897.

Application filed March 23, 1896. Serial No. 584,432. (No model.)

*To all whom it may concern:*

Be it known that I, JOHN F. KLINGLE-SMITH, of the city of St. Louis, State of Missouri, have invented certain new and useful Improvements in Farm-Gates, of which the following is a full, clear, and exact description, reference being had to the accompanying drawings, forming a part hereof.

My invention relates to an improved farm-gate; and it consists in the novel construction, combination, and arrangement of parts hereinafter described and claimed.

In the drawings, Figure 1 is a side elevation of my improved farm-gate, the vertical operation of the gate being shown in dotted lines. Fig. 2 is a top plan view of the parts shown in Fig. 1. Fig. 3 is a vertical sectional view on the line 3 3 of Fig. 2. Fig. 4 is a side elevation of a modified form of my gate partly broken away. Fig. 5 is a horizontal sectional view on the line 5 5 of Fig. 1.

Referring by numerals to the drawings, 1 and 2 are the posts of the fence. The gate is a rectangular frame consisting of the top and bottom horizontal parallel bars 3, 4, and 5, the intermediate horizontal parallel bars 6, and the vertical parallel bars 7, 8, and 9. The bars 7, 8, and 9 are arranged in pairs transversely of and one upon each side of the horizontal bars 3, 4, 5, and 6 and at right angles thereto. Between the bars 8 adjacent the front ends of the bars 6 is placed a board 10, having a series of small notches 11 on its front edge and the larger semicircular notches 12 in its rear edge. The front ends 13 of the bars 6 are rounded and placed in the notches 12, thus forming knuckle-joints. Horizontally and vertically alined bolts 14 connect the horizontal and vertical bars together, and each of said bolts acts as a hinge-pin, thus allowing the front end of the gate to have a vertical motion. A link 15 is attached to the bar 3 in front of and adjacent to the bar 7, and the free end of said link drops down straddle of the bar 8 and engages the notches 11 on the board 10 and acts like a ratchet to limit the downward motion of the gate. The gate is supported by the hinges 16, attached to the post 2. A latch 17 is attached to the post 1 and engages the front end of the gate to hold it shut.

In the modified form shown in Fig. 4 the bars 18 are cut shorter than the bars 3, 4, and 5. The notched board 10 is placed between short bars 19, which have their ends attached to the bars 4 and 5 in vertical alinement with the ends of the bars 18. The link 15 is cut short and operates straddle of the bars 19 and inside of the bars 8.

The distinguishing feature of my improved farm-gate is the joints between the horizontal and vertical bars, which joints permit of a vertical motion of the free end of the gate and the link and ratchet-face on the free end of the gate, by which the gate may be held in any desired position relative to the horizontal. This feature of the gate will be found very useful and convenient in many ways. By its adoption the gate may be made to swing up and down hill and may be stopped at any desired position relative to the fence by lifting the link and allowing the front corner of the gate to sag to the ground. In the case of a heavy snow-fall the front end of the gate may be raised, as shown in dotted lines in Fig. 1, and the necessity of shoveling away a large amount of snow is obviated.

By means of the ratchet a sagging of the gate may be taken up from time to time, or when the gate is used but little the ratchet may be raised and the gate allowed to stand upon the ground, thus taking the strain off of the hinges and the fence-posts.

The principal advantage of the modified form shown in Fig. 4 is that the danger of a collision between the link 15 and the post 1 is obviated by putting the link inside of the bars 8. Further than this, the front end of the gate is stiffened and strengthened by the construction shown in Fig. 4.

My improved farm-gate is light, strong, durable, convenient to operate, and very useful and efficient.

I claim—

In a gate, the horizontal parallel bars 3, 4 and 5, the intermediate parallel bars 6, the vertical parallel bars 7, 8 and 9 arranged in pairs transversely of and one upon each side of said horizontal bars and at right angles thereto, the board 10, having the series of notches 11 on its front edge and the semicircular notches 12 on its rear edge, placed between the bars 8 with the front ends of the bars 6 in said semicircular notches 12, said bars 6 having their front ends rounded to form joints with said notches 12, the bolts 14 connecting the horizontal and vertical bars and acting as hinge-pins, and the link 15 pivotally attached at one of its ends to the bar 3 in front of and adjacent to the upper ends of the bars 7, with its free end encircling the bars 8 and engaging the notches 11 in the front face of the board 10, substantially as specified.

In testimony whereof I affix my signature in presence of two witnesses.

JOHN F. KLINGLESMITH.

Witnesses:
S. G. WELLS,
MAUD GRIFFIN.